R. MOLDENKE.
MANUFACTURE OF ALUM CAKE.
APPLICATION FILED OCT. 17, 1919.
1,388,436.
Patented Aug. 23, 1921.
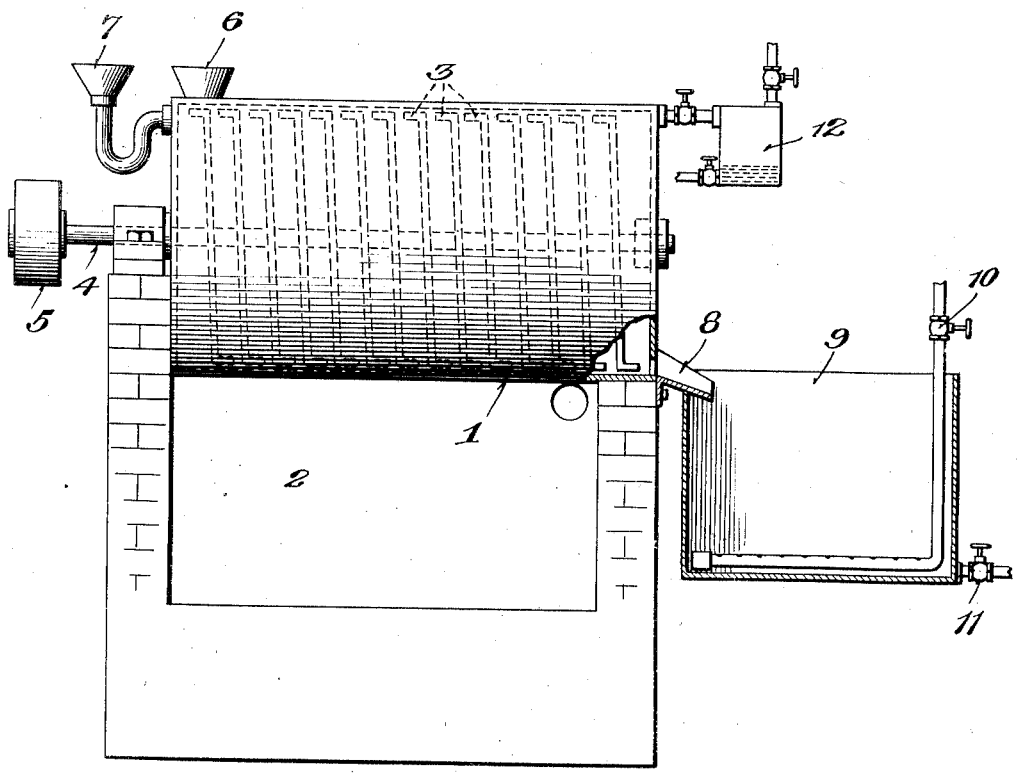
Witness
Chas. L. Griesbauer
Inventor
Richard Moldenke
By R. P. McElroy
Attorney

UNITED STATES PATENT OFFICE.

RICHARD MOLDENKE, OF WATCHUNG, NEW JERSEY.

MANUFACTURE OF ALUM CAKE.

1,388,436.   Specification of Letters Patent.   Patented Aug. 23, 1921.

Application filed October 17, 1919. Serial No. 331,434.

*To all whom it may concern:*

Be it known that I, RICHARD MOLDENKE, a citizen of the United States, residing at Watchung, in the county of Somerset and State of New Jersey, have invented certain new and useful Improvements in the Manufacture of Alum Cake, of which the following is a specification.

This invention relates to the manufacture of alum cake; and it comprises a method of producing relatively pure hydrated aluminum sulfate or sulfate of alumina or alum from bauxite, clay and other minerals containing available alumina, wherein fine-ground material is converted into a paste or slurry with sulfuric acid in amount somewhat less than that corresponding to the available alumina present, the paste is kept in vigorous agitation by powerful stirring and breaking means during the period of chemical action in order to prevent hardening into a cake or mass, the material during such agitation being maintained hot and in an atmosphere of its own vapors, after completion of the reaction the fine-grained mass is contacted with about the amount of water necessary to make the hydrated alum cake, the contact being effected hot, and the hot liquid separated from insolubles and allowed to set by cooling; all as more fully hereinafter set forth and as claimed.

Bauxite, or beauxite, is an earthy mineral containing hydrated alumina. It always contains more or less iron (as oxid and silicates), clay, titanium oxid, etc.; and it shades off into iron ores on the one hand and clays on the other. Being the product of rock disintegration, it invariably contains more or less rocky or stony matter in granular form. Its commercial value is measured by the amount of readily available hydrated alumina present. Other minerals present contain alumina which yields to acids, etc., with more or less readiness and is therefore to that extent available. In making aluminum sulfate in the commercial form of "sulfate of alumina" it is the custom to treat bauxite with sulfuric acid, which unites with alumina (and also with the iron, etc., present) to form soluble sulfates which are afterward recovered in various ways. Sulfate of alumina is also made from clay and other minerals more resistant than bauxite in much the same manner, the clay when used being sometimes given a slight preliminary roast in order to increase the availability of the alumina. Commercial sulfate of alumina differs somewhat from the pure chemical known as "aluminum sulfate" in that it is not of absolutely definite composition and usually contains more or less impurity. Normal aluminum sulfate is $Al_2(SO_4)_3$ or $Al_2O_3.3SO_3$ and in sulfate of alumina the molecular ratio of $Al_2O_3$ to $SO_3$ is rarely exactly 1:3 although it approaches it. Ordinarily it is somewhat basic; that is it contains a little more $Al_2O_3$ than corresponds to the 1:3 ratio. It may however be called aluminum sulfate for the sake of simplicity of nomenclature.

In the various methods of producing aluminum sulfate from bauxite it is difficult to secure economically a good yield and a clean product. In particular it is difficult to obtain material free, or nearly free, of iron. All bauxite contains iron in the form of oxid or hydrated oxid, and this oxid sulfates in the same manner as the alumina, forming iron sulfates which are sufficiently like aluminum sulfate, chemically, to render purification laborious and costly. Further, if dilute acid be used the chemical action is slow while with concentrated sulfuric acid the mass of bauxite and acid heats up spontaneously and sets to a hard cake, usually inclosing more or less unaffected material. If the strong acid be used in large excess to insure complete conversion there is a waste of acid and, further, the reaction product is impure. Recovery of the excess of acid is expensive. With clay, these stated difficulties also occur and in greater measure.

In the present method I take account of these difficulties and provide a cheap, simple and ready way of making a commercial, pure aluminum sulfate from bauxite, clay and the like.

In the best mode of operation under my invention, the bauxite is rapidly made into a paste, dough or slurry with about the amount of sulfuric acid corresponding to the available alumina present; using no material excess over this amount. In so doing, the iron is not much attacked and I obtain a final product which is, to that extent, purer than that usually produced. Sulfuric acid of 60° Baumé, or 66° Baumé, may be used. The first action of the acid on the bauxite is to wet it as any other liquid would; it forms a mud or paste of fairly fluent character. As chemical action takes place, the mass normally heats up and becomes stiffer, until it finally becomes a hard cake. This cake is difficult to handle and moreover conversion with the limited amount of acid here contemplated is never complete if the hardening and setting be allowed to take place. Therefore, as soon as I make the fluent mass of acid and bauxite, I at once begin to agitate or break up with suitable mechanism. Some form of agitator with cutting or breaking blades and energetic action is desirable. It may be made, as may the rest of the apparatus, of any of the acid-resistant irons or steels. As stated, the mass heats up of itself and becomes very hot; the heat depending, however, somewhat upon the character of the acid, the richness of the bauxite, etc. I may, or may not, use external heat at this stage of the operation. Usually I do, reinforcing the heat developed in the action by outside heat. The temperature may be allowed to go to 500° or 600° F.; or sufficiently high to produce free volatilization of the sulfuric acid. The agitation is so conducted as to maintain the mass loose. At the end it should be of granular character. Because of the heat and comminution, vapors of sulfuric acid are freely evolved and all portions of the material are in contact with these vapors. By operating in a closed chamber, the mass can be maintained hot, as hot as 500° or 600° F. without loss of acid since the evolved vapors are ultimately taken up again. Under these circumstances, evolution of vapors from the acid wet particles of the mass only goes so far as corresponds to the partial pressure or vapor tension of sulfuric acid at the temperature employed. No substantial pressure above atmospheric is desirable. The object is to retain the vapors at their normal partial pressure in contact with the hot material. The material being kept fairly fine-grained by the agitation, there is an opportunity for thorough interaction between the sulfuric acid either as liquid or as vapor and all portions of the solid material, without the necessity for the use of an excess of acid which would bring iron into combination, would waste acid and would be difficult of subsequent removal. The comminution, agitation and contact of the material with the acid vapors should be continued until reaction is substantially complete. The operation may be performed in an apparatus much like an ordinary conveyer with cutting blades, but the chamber should be rather roomy as compared with the amount of material under treatment to give an ample vapor space. The dimensions may be so chosen that the material will be converted during a passage from end to end, thereby making the operation continuous. Where artificial heat is used, it is often merely necessary at the delivery end; and if desired the casing may be heated directly at this end only. Ordinarily however I simply maintain the whole converting apparatus over a fire chamber. In operating with clay the apparatus and the manipulation are substantially the same save that the greater difficulty of reacting with clay necessitates a longer period of travel of the clay and acid than is required with bauxite.

The more or less granular, converted, hot material is delivered directly into water of such a temperature that the temperature of the mixture is around 100° C. The total amount of water in the converted material and in the bath to which it is added should be about that necessary for water of crystallization of the aluminum sulfate to be produced. Under these conditions, a hot liquid mixture is obtained which can be readily separated from accompanying undissolved sand, clay, iron oxid, silica, etc., by simple filtration or settling. The liquid material is equivalent to hydrated aluminum sulfate melted in its water of crystallization. Silica produced by breaking up of silicates is in the insoluble form. After removal of the insoluble residues, the clear liquid material on cooling sets to a hard, crystalline, commercial cake. With care in the operation, this cake is, or may be, practically free of iron and other things than aluminum sulfate and is therefore of high commercial grade.

In treating clay, or bauxite containing much clay, the operation is as stated about the same, save that if it be desired to render the clay available, it is usually better to give the material a slight preliminary roast.

After the production of the crystallized cake in the manner described, it may be dehydrated or dried in any of the usual commercial apparatus or by any of the usual methods. Where it is desirable to have balls, eggs, or pellets of known shape or weight, the liquid mass coming from the filters may be cooled in molding devices of appropriate character.

The same process is applicable to the manufacture of alum instead of aluminum sulfate (concentrated alum), where potash or soda is present in the original material or is subsequently added. Potassium sulfate, sodium sulfate or ammonium sulfate may be added after the filtering stage. Under these conditions, the final product is alum instead of alum cake.

In the accompanying illustration I have shown, more or less diagrammatically, apparatus suitable for use in the described process. In this showing the view is in longitudinal vertical section, certain parts being shown in elevation.

In this view element 1 designates a casing of acid resistant iron or the like set on furnace chamber 2 provided with suitable firing means (not shown). As shown the conversion chamber contains breaking or cutting conveyer 3 mounted on shaft 4 actuated by pulley 5 or the like. At the feed end this drum is provided with hopper 6 for delivering bauxite or clay and acid feed device 7 for supplying sulfuric acid. The solid and liquid are mixed by the action of the breaking conveyer and at first form a paste or slurry which quickly tends to harden but is prevented going over into a cake by the action of the cutting or breaking blades of the conveyer. Because of the chemical action ensuing upon mixture heat is developed and heat is further introduced from the furnace chamber with the result of vaporizing more or less of the acid. The comminuted material feeds forward exposed to the action of liquid and vaporized acid and ultimately reaches the further end of the casing. Since the amount of sulfuric acid used is ordinarily merely that which will be taken up by the alumina or possibly a little less, there is no loss of acid in this heating operation. It sometimes happens that I wish to add the acid in two or more portions. The granular material reaching the end of the converting casing goes through diagrammatically shown conduit 8 into a hydrating tank or casing 9. One such casing is shown but in practice two or more are employed to provide for continuous operation. In order to promote solution and keep up the temperature, the mass in the tank may be agitated by blowing in steam through valved pipe 10. When solution is complete the liquid material may be removed through gated outlet 11 for clarification or filtration. Where the apparatus is run rather hot and there is a tendency for formation of acid vapors at a greater rate than they are absorbed escaping vapors may be recovered by allowing them to pass through sulfuric acid trap 12. Sulfuric acid takes up $SO_3$ and $H_2SO_4$ vapors. Stirring may be with compressed air instead of being with steam. Water may be added to the material in tank 9 in any convenient way.

What I claim is:—

1. The process of making aluminum sulfate which comprises mixing a fine powdered aluminous mineral with about the amount of strong sulfuric acid corresponding to the available alumina present, vigorously agitating the mixture at a high temperature in an atmosphere of acid vapors to form aluminum sulfate while preventing its setting in cake form and to cause it to take a granular form, the agitation being continued to prevent its setting and to retain it in a granular state until reaction is complete and thereafter mixing the granular reaction product with about the amount of water necessary to make crystallized sulfate and separating from insoluble materials while the mixture is hot.

2. The process of making aluminum sulfate which comprises mixing a fine powdered aluminous mineral with about the amount of sulfuric acid corresponding to the available alumina present, vigorously agitating the mixture to prevent its setting and to retain it in a granular state until reaction is complete, the mixing being conducted in a closed chamber adapted to retain acid vapors in contact with the material, and thereafter mixing the granular reaction product with about the amount of water necessary to make crystallized sulfate and separating from insoluble materials while the mixture is hot.

3. The process of making aluminum sulfate which comprises mingling bauxite with about the right amount of sulfuric acid to form aluminum sulfate with the available alumina present, stirring the mixture to prevent formation of a cake, such stirring being performed in a chamber closed against escape of acid and maintained at a temperature around 500° to 600° F., treating the hot granular material with about the amount of water necessary to form crystallized aluminum sulfate and separating liquid materials from undissolved materials while hot.

In testimony whereof, I affix my signature hereto.

RICHARD MOLDENKE.